June 21, 1960  J. E. COOK  2,941,712
CENTRIFUGAL SEPARATION SYSTEM WITH EMERGENCY CONTROL
Filed March 25, 1955

INVENTOR.
James E. Cook
BY
Davis, Hoxie & Faithfull
ATTORNEYS

United States Patent Office 2,941,712
Patented June 21, 1960

2,941,712

CENTRIFUGAL SEPARATION SYSTEM WITH EMERGENCY CONTROL

James Edward Cook, Poughkeepsie, N.Y., assignor to The De Laval Separator Company, Poughkeepsie, N.Y., a corporation of New Jersey Filed Mar. 25, 1955, Ser. No. 496,863

16 Claims. (Cl. 233—19)

This invention relates to centrifugal separation systems and particularly to such a system in which the flow rate of one of the centrifugally separated components discharged from the system is a small percentage of the flow rate of the feed liquid passed into the system.

The practice of centrifugal purification of oils such as fuel oils, lube oils and insulating oils is well known and a common practice. In systems for this purpose, relatively small amounts of water contaminant are removed from the oil. In fact, the amount of water contaminant is generally so small that the centrifuge bowl is first partly filled with water to act as a "seal" within the bowl to prevent substantial discharge of oil through the water outlet when the system is placed in operation. Thereafter, while the system is in operation, the relatively small amounts of water separated within the bowl from the feed liquid serve to maintain the "seal" within the bowl, and any surplus that is separated within the bowl is discharged through the water outlet from the system. If for any reason the water "seal" is broken within the bowl, the separated oil will discharge from both outlets (the water outlet and the normal oil outlet) of the centrifugal bowl. Since the water outlet from the system is usually connected to a waste disposal or sewer, it will be seen that constant attendance is necessary to avoid possible heavy loss of valuable oil.

The principal object of this invention is to provide an improved system of the character described in which the operation of the system is automatically stopped whenever the discharge rate through the path for the separated component representing the small percentage exceeds a predetermined norm.

A centrifugal separation system according to the present invention includes a centrifugal purifier having separate discharge lines for major and minor separated components, such as oil and water, respectively, a feed line for supplying a mixture of these components to the purifier, and operating means for feeding the mixture through the feed line and driving the purifier. In the discharge line for the minor separated component is a float chamber in which the liquid level increases with a predetermined abnormal rate of flow through this line. A float in this chamber is connected to a control element, preferably a switch, which is operated by the float when the liquid in the chamber exceeds a predetermined level. As long as the flow rate through the float chamber does not exceed a value corresponding to a normal rate of discharge of the minor component, the control element remains inactive; but when the maximum normal rate is exceeded, the control element responds, as by opening of the switch.

A connection is provided between the control element and the operating means of the system for rendering the system inoperative in response to an abnormal rate of flow through the discharge line for the minor component. In the preferred system, the operating means include a solenoid valve in the feed line and electric motors for driving the purifier and driving a pump in the feed line; and the float of the control device operates a switch connected into the circuitry of the motors and valve so that the system is completely shut down in response to operation of the control switch by the float.

In the preferred form of the invention, the lower portion of the float chamber is a generally annular space surrounding a central space and separated therefrom by a tube, the inlet of the chamber leading to this annular space and the outlet leading into the central space. At its upper end, the tube forms a seat for the float and is serrated to form passages providing the outlet through which the liquid discharges from the float chamber when the float is seated. Due to the seating of the float, an abnormal flow rate will cause the liquid level to rise around the float and above the weir formed by the serrations in the upper end of the tube, and if this abnormal flow is more than momentary, the float will be lifted so as to operate the control element and shut-off the system. The top of the float chamber is closed by a flexible diaphragm through which the float is connected to the switch, and when the switch has been operated by the float, it can be re-set by a manually operable member to re-start the system.

For a better understanding of the invention, reference may be had to the accompanying drawing in which.

Figure 1:
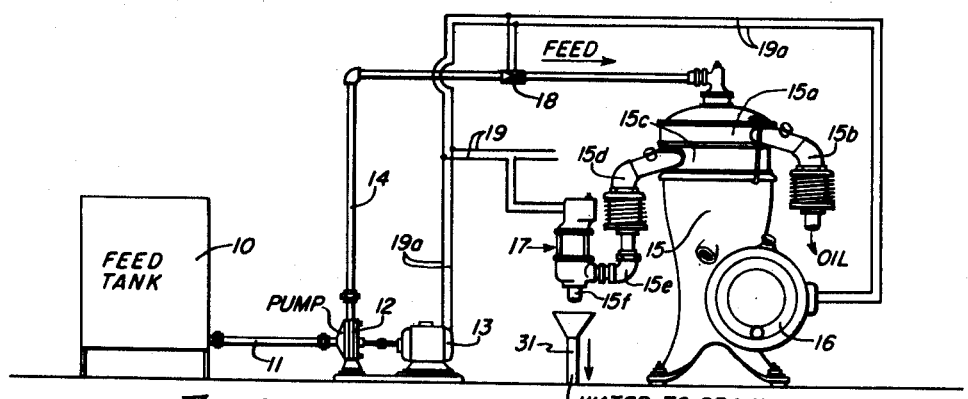
Figure 1 is a diagrammatic illustration of a system for accomplishing a purification treatment of a liquid in accordance with the invention.

Referring now to Figure 1, the feed tank for the centrifugal separation system is shown at 10. The liquid to be purified, which is here assumed to be oil contaminated with water, is withdrawn through pipe 11 by pump 12 driven by a motor 13 and is passed by the pump 12 through pipe 14 to a centrifugal purifier 15 driven by motor 16. Within the rotating bowl of the purifier 15, the feed liquid is separated into its relatively heavier and lighter components, the lighter component or oil (the major component) being discharged through collecting cover 15a and passed therefrom via a spout or discharge line 15b to a collecting tank (not shown). The heavier component or water (the minor component) is discharged from the rotating bowl into collecting cover 15c and passed therefrom via a spout or discharge line 15d to a second collecting tank (not shown).

The control device is indicated at 17 and is connected into the discharge line 15d for the centrifugally separated minor component of the feed stream.

A shut-off valve 18 also is included in the system by inserting the same in the feed pipe 14 of the purifier 15. The valve 18 may be of the electrically operated solenoid type (as indicated in Figure 1) or of a type adapted for mechanical operation in response to the actuation of the control device.

In the illustrated form of the invention, the control device includes a switch electrically connected to the control means of the system, such control means including the solenoid-type valve 18 and the motors 13 and 16 for driving the pump 12 and the purifier 15, respectively. As shown, the switch of the control device 17 is inserted in the electric supply line 19 from which the control means are energized through wiring 19a.

Figures 2, 3:
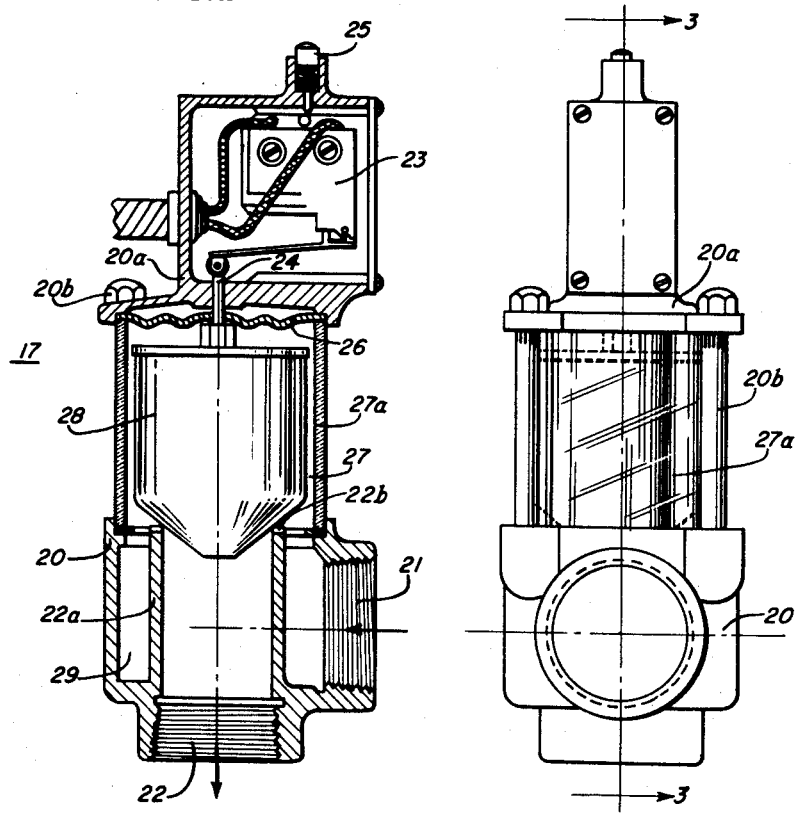
Figure 2 is an elevational view of the control device for the system.
Figure 3 is a sectional view of the control device taken along line 3—3 of Figure 2.

Referring now to Figures 2 and 3, I have there shown a preferred form of control device 17 which is particularly adapted for use in conjunction with the separation system according to the invention. The housing 20 of the control device comprises a generally circular portion carrying the inlet and outlet connections or ports 21 and 22, respectively, whereby the device is connected into the system, and a generally rectangular top portion 20a enclosing the electric switch 23. The switch is adapted to be actuated by plungers 24 and 25 extending through the housing portion 20a.

The plunger 24 passes from switch 23 through the base portion of housing 20a and is secured with a sealed connection to a flexible disc or diaphragm 26 clamped between the housing sections 20 and 20a by bolts 20b. With disc 26 so clamped between the housing portions 20 and 20a, a hermetically sealed float chamber 27 is formed connecting the inlet and outlet ports 21 and 22 of the control unit. The lower end of plunger 24 extends through diaphragm 26 and into chamber 27, where it is secured to a float 28 arranged within chamber 27. Thus, the switch 23 is actuated by the rise and fall of the float 28 within the chamber 27. For convenience in visually observing the flow of liquid through chamber 27, that part of the wall of housing 20 which forms the upper portion of chamber 27 may be made of glass or other transparent material 27a, as shown in the drawing.

The plunger 25 extends through the top portion of housing 20a and actuates the reset button of the switch 23. Thus, the plunger 25 constitutes a manually operable re-set member connected to the switch for re-setting it after operation thereof by the float, whereby operation of the system is resumed.

The outlet port 22 is connected with the chamber 27 by a tube-like extension 22a. The tube 22a may be a concentric wall formed as part of the housing 20, as shown. The upper end of tube 22a extends above the liquid level determined by the inlet port 21, and thus serves as a weir over which all of the liquid entering via port 21 must pass to reach the outlet port 22. The upper end of the tube 22a is notched or serrated at 22b, and the float 28 normally rests upon the upper edges of the serrations. The size of the serrations 22b is dependent on the normal flow rate of the water or minor separated component of the feed stream. That is, the flow passages determined by the serrations form an outlet which is sufficient to pass only slightly more than the normal flow rate of the separated water component.

In the following description of the operation of a centrifugal separating system according to this invention, the aforementioned purification of oil will be used as an example. The contaminated oil to be purified is withdrawn from tank 10 via pipe 11 by pump 12 driven by motor 13 and fed to the centrifugal purifier 15 via pipe 14 and through the normally open solenoid-operated valve 18. Within the rotating bowl of the purifier driven by motor 16, the contaminated oil is separated into its components, that is, the water contaminant and pure oil, according to their relative specific gravities as is well known in the art. The water contaminant, being the heavier component, is thrown to the periphery of the rotating bowl and is discharged therefrom via line 15d. The purified oil, being the lighter component, passes to the center of the rotating bowl and is discharged therefrom via line 15b and is collected for storage or used immediately as the occasion demands.

The flow rate of liquid from the discharge line 15d, that is, the flow rate of the water contaminant discharged under normal conditions is quite small and may even be intermittent. This discharge stream has a flow rate which is a relatively small percentage of the flow rate of the purified oil discharge stream, and, accordingly, is well suited as the stream to be used as the control activating medium to be passed through the control unit 17.

The liquid from discharge line 15d passes via pipe 15e to the inlet port 21 of the control unit (see Fig. 2) and, after filling the lower portion 29 of the float chamber, defined between the wall of housing 20 and the tube 22a, flows over the weir formed by serrations 22b into tube 22a. The liquid passes from the interior of tube 22a via outlet port 22 and piping 15f (see Fig. 1) to waste.

As has been described above, the through-flow area for the escape of liquid from chamber 29 to the tube 22a is defined by the size of the serrations 22b and should be sufficient to accommodate only a slight excess of the normal flow rate of the liquid entering the control device via port 21. Should the rotating bowl begin to lose its water "seal," due, for instance, to a temporary reduction of the amount of water contaminant in the feed stream, some oil will be passed out of the bowl with the water through discharge line 15d and flow into chamber 29. The liquid collecting within the chamber 29 is subject to a considerable degree of quiescence and the oil and water therein will separate, the oil forming as an upper layer and the water as the lower layer.

At first the oil layer formed on top of the water will pass through the openings formed by serrations 22b and flow to the drain connection 22, but as the rate of feed of oil and water to the chamber 29 increases, the oil layer will be raised above the serrations and collect in chamber 27, where it will be visible through the wall of the housing. The weight of float 28 is such that it will not be raised except by almost total immersion in the oil layer, and when the oil layer rises above the level of the upper edge of the serrations 22b, water rather than oil will flow into the tube 22a. Unless the abnormal flow rate is more than momentary, a slight excess of the normal water flow will be passed to the drain connection via tube 22a. If and when the normal rate of water contamination in the feed stream is resumed, the rotating bowl will regain its water seal and the flow of oil into the water discharge stream passing through the control device 17 will cease. In this circumstance, the oil level in chamber 27 will gradually recede, and ultimately, the last of the oil layer will pass to the drain connection 19 through the serrations 22b.

From the above description of the operation of the separation system according to the invention, it will be seen that only a small amount of oil was lost to the drain connection during a temporary abnormal flow through the water discharge line 15d, and during this time a visible indication was available to an operator that the system was out of balance. If the rotating bowl had continued to pass oil through the discharge line 15d, the oil level in chamber 27 would have continued to rise and ultimately caused the float 28 to rise. With the rising of float 28, the circuitry through switch 23 is opened. This circuitry, as shown includes the solenoid holding valve 18 open, as well as the driving motors 13 and 16 for the feed pump 12 and the purifier 15, respectively. Accordingly, with the opening of the circuitry at switch 23, the feed to the purifier and the purifier itself are shut-off automatically and no more oil will be lost to the drain connection. After the operator readjusts the feed rate to the system, the switch 23 may be reset to its normally closed position by pushing reset button 25, and operation of the separation system is resumed.

It will be observed that the upper part of the float chamber in the housing 20 serves to trap the lighter component or oil during any short period of abnormal flow through the water discharge line 15d due to breaking of the liquid seal in the centrifugal bowl. The accumulation of any substantial quantity of such oil is revealed through the transparent wall 27a, so that the operator can divert the discharge of line 15f from the drain to a suitable receptacle (not shown), as by means of the removable funnel 31 normally leading to the drain, thereby avoiding even a small loss of oil to the drain due to emptying of the trapped oil from the float chamber when normal flow is resumed or when operation of the system is automatically stopped by actuation of switch 23.

The control device 17 is also adapted to respond to the passage of any abnormal amounts of water through the system. This water will be removed from the oil within the roating bowl of the purifier and passed via line 15d to the control device 17. When the flow rate of water entering chamber 29 exceeds the flow rate through serrations 22b to the drain connection 15f, the level of the water rises in chamber 27 and quickly causes float 28 to rise, thus opening the circuitry through solenoid valve 18 and the motors 13 and 16, as described above. Accordingly, the control device of the separation system according to the invention automatically shuts down the system in response to any appreciable increase of the water contaminant content of the feed stream.

It will be apparent from the foregoing that the valve 18, motors 13 and 16 and pump 12 form operating means for feeding the mixture through the feed line 14 and driving the purifier; and the wiring 19—19a forms an operative connection between such operating means and the control element or switch 23, the latter being operable through this connection to render the system inoperative in response to an abnormal flow rate through discharge line 15d. However, such operating means and operative connection may take other forms than as specifically described and illustrated herein.

I claim:

1. In a centrifugal separating system, the combination of a centrifugal purifier having separate discharge lines for continuous discharge of major and minor separated components, respectively, a feed line for supplying a mixture of said components to the purifier, operating means for feeding the mixture through the feed line and driving the purifier, a float chamber in the discharge line for the minor separated component, said chamber having an outlet for discharging the minor separated component at a rate less than a predetermined high rate of flow through said last line, whereby the liquid level in said chamber increases in response to said predetermined high rate of flow through said last line, a control element, an operative connection between the control element and said operating means, said element being movable from an operating position to a non-operating position to render said operating means inoperative, and means including a float in said chamber for moving said element to said non-operating position in response to a predetermined increase in said liquid level in the chamber.

2. The combination according to claim 1, in which said float chamber has a tranparent wall.

3. The combination according to claim 1, in which the control element is a switch connected to the float.

4. The combination according to claim 1, in which the control element is a switch connected to the float, and comprising also a manually operable re-set member connected to the switch for restoring the system to its operative condition.

5. The combination according to claim 1, in which the control element is a switch connected to the float, and comprising also a flexible diaphragm closing the top of the float chamber and through which the float is connected to the switch.

6. The combination according to claim 1, in which the float chamber has an inlet, the chamber outlet being a weir over which the liquid from said inlet discharges from the chamber, the float being located in the chamber above the weir and adapted to operate said control element when the liquid in the chamber exceeds a predetermined level above the weir.

7. The combination according to claim 1, comprising also a central tube forming the inner wall of an annular lower portion of the float chamber and also forming a central space to which said outlet leads, the chamber having an inlet leading to said annular lower portion, the upper end of the tube forming a seat for the float and also forming a weir constituting said outlet when the float is seated.

8. The combination according to claim 7, in which the upper end of the tube is serrated to form said outlet.

9. A combination according to claim 1, in which said operating means include a valve in the feed line, said operative connection extending to the valve and being operable to close the valve in response to said high flow rate.

10. A combination according to claim 1, in which said operating means include an electric motor for driving the purifier, the control element being a switch connected to the motor through said operative connection.

11. A combination according to claim 1, in which said operating means include a pump in the feed line and an electric motor for driving the pump, the control element being a switch connected to the pump motor through said operative connection.

12. For use in a centrifugal separating system including a centrifugal purifier having a liquid discharge line for a separated component and also including operating means by which the system is operated to separate a mixture fed to the purifier, a control device comprising a float chamber adapted to receive a liquid discharge from said line, said chamber having an inlet for said discharge and also having an outlet located in the chamber above said inlet, the outlet having a predetermined throughflow area affording outflow from the chamber at a predetermined maximum rate, a float located in the chamber above the outlet, and a control element connected to the float and operable thereby when the liquid in the chamber exceeds a predetermined level above the outlet in response to supply of said discharge to the inlet at a rate greater than said maximum rate, the control element being adapted for connection to said operating means.

13. A control device according to claim 12, in which the control element is a switch connected to the float, the control device comprising also a manually operable re-set member connected to the switch.

14. A control device according to claim 12, comprising also a flexible diaphragm closing the top of the float chamber and through which the float is connected to the control element.

15. A control device according to claim 12, comprising also a central tube forming the inner wall of a generally annular lower portion of the chamber, the tube also forming a central space, said inlet leading to the annular space, said outlet leading to the upper portion of the central space, the upper end of the tube forming a seat for the float and also forming a weir constituting said outlet.

16. A control device according to claim 15, in which the upper end of said tube is serrated to form liquid flow passages from the inlet to the central space when the float is seated.

References Cited in the file of this patent

UNITED STATES PATENTS

| | | |
|---|---|---|
| 1,153,701 | Overholt et al. | Sept. 14, 1915 |
| 1,373,219 | Beach | Mar. 29, 1921 |
| 2,121,241 | Bach | June 21, 1938 |

FOREIGN PATENTS

| | | |
|---|---|---|
| 674,585 | Germany | Apr. 15, 1939 |
| 677,969 | Germany | July 5, 1939 |
| 815,248 | France | Apr. 5, 1937 |